Aug. 17, 1965  M. A. BRIGGS  3,200,936
ARTICLE PICK-UP AND DELIVERY APPARATUS
Filed Feb. 25, 1963  2 Sheets-Sheet 2
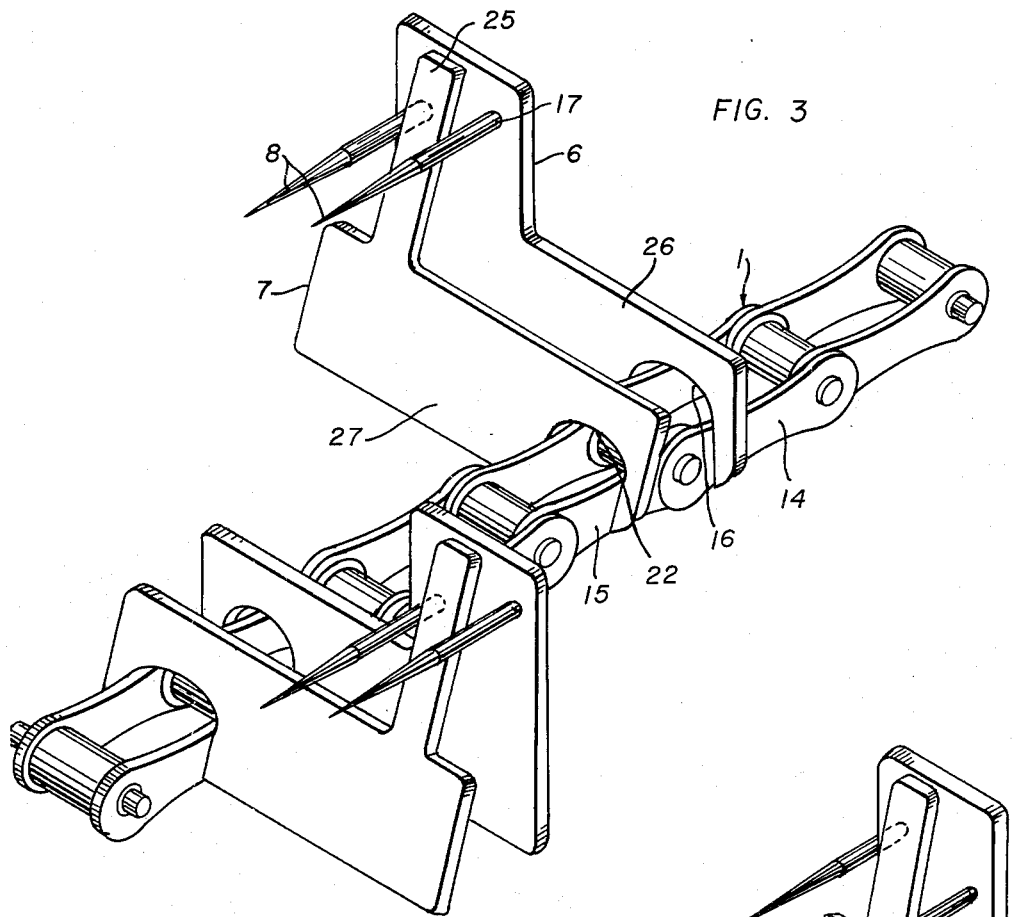
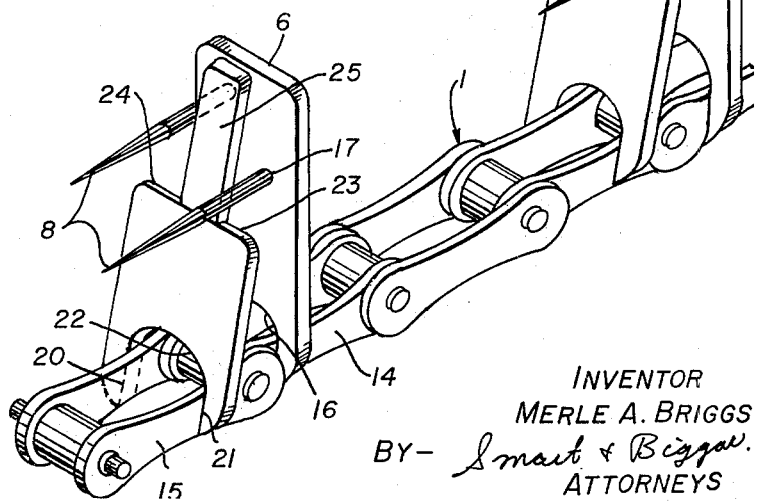
INVENTOR
MERLE A. BRIGGS
BY- *Smart & Biggar*
ATTORNEYS

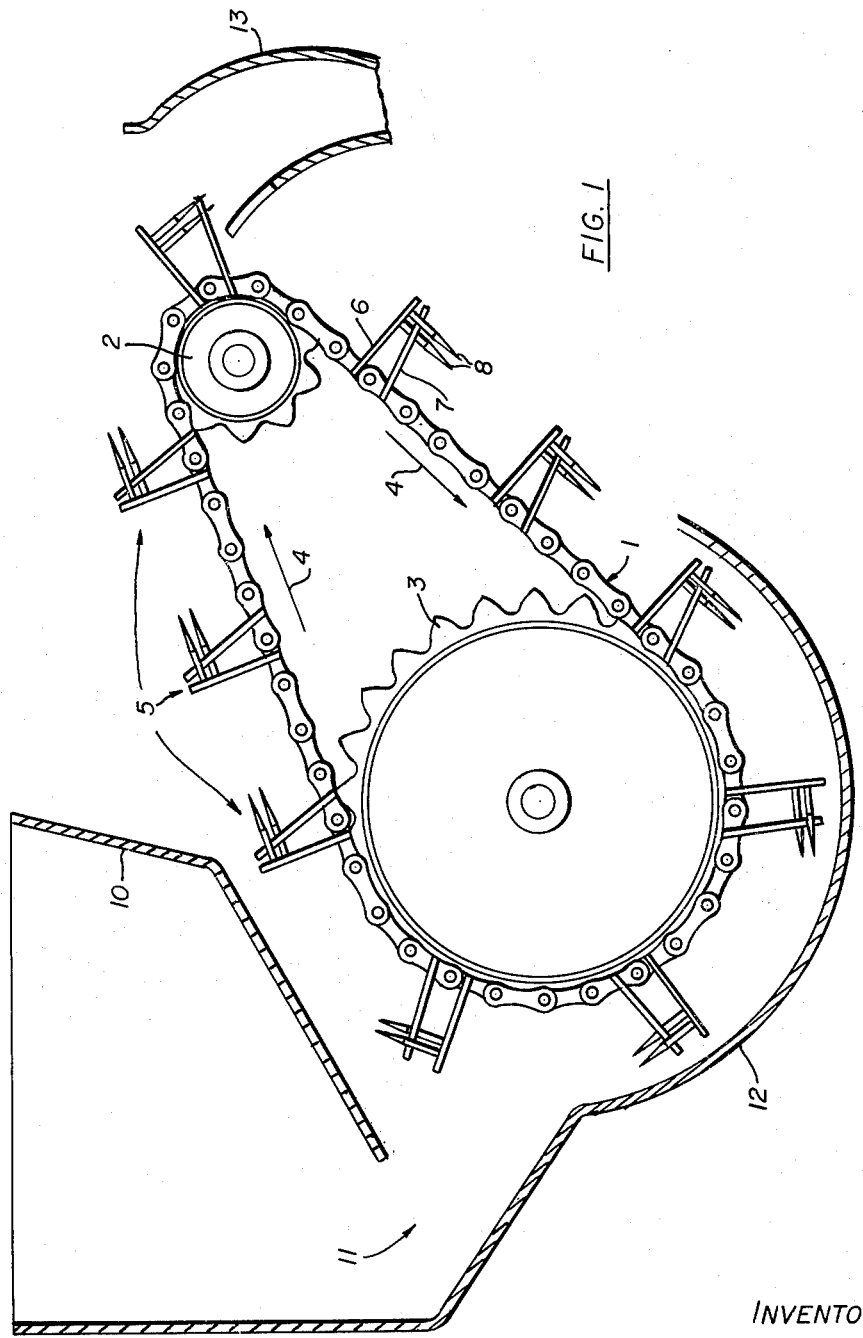

United States Patent Office 3,200,936
Patented Aug. 17, 1965

3,200,936
ARTICLE PICK-UP AND DELIVERY APPARATUS
Merle A. Briggs, R.R. 2, Plaster Rock,
New Brunswick, Canada
Filed Feb. 25, 1963, Ser. No. 260,501
6 Claims. (Cl. 198—178)

This invention relates to article pick-up and delivery apparatus and more particularly to apparatus for picking up a potato or other tuber from a storage hopper, conveying it and depositing it at a predetermined location.

This invention has particular applicability to apparatus for the cutting and planting of seed potatoes. In such apparatus, particularly if a field traversing planter is used, potatoes are picked out of a storage hopper, conveyed to cutting apparatus and there deposited at predetermined intervals for cutting and planting. It is important that potatoes be deposited at predetermined intervals since the field traversing planter will be in motion and any irregularity in the timing of the pick-up and delivery apparatus will result in gaps or irregularities in seed spacing in the rows of planted potatoes.

One type of pick-up and delivery apparatus in use is the cup pick-up which is disclosed generally in my copending United States application Serial No. 119,090 filed June 23, 1961, now Patent No. 3,090,414. This type of pick-up and delivery apparatus consists principally of an endless conveyor belt or chain passing over two pulleys or sprockets and having cup shaped receptacles projecting from the outer surface thereof. The conveyor belt or chain is substantially vertically situated and, in the course of its upward movement, passes through a storage hopper containing potatoes. Theoretically each receptacle picks up a potato as it passes through the storage hopper and, as the conveyor travels upwardly and over the upper pulley or sprocket, the cup is tipped and the potato dumped into a receiving chute directed towards the cutting apparatus.

This known type of pick-up and delivery apparatus has proven unsatisfactory since, as the receptacles must be small enough to hold only one potato to avoid jamming the cutting apparatus, the receptacles quite often fail to pick up a potato in the course of travel through the storage hopper. The jostling of the machine, due to vibration as the apparatus is hauled over the ground, causes potatoes to tumble out of the receptacles or bounce off the edges of the receptacles without being retained thereby. As a result, gaps or irregularities appear in the seed spacing in the rows of planted potatoes. In addition, the cup pick-up and delivery apparatus is quite unsuitable for high speed operation since the faster the receptacles move through the storage hopper, the greater the likelihood that they will fail to pick up a potato since the potatoes are more likely to bounce out of the receptacles or to be knocked aside by the edges of the receptacles.

Another known form of pick-up and delivery apparatus is similar to that described above but replaces the cup shaped receptacle with an outstanding element carrying an impaling spike adapted to impale a potato upon its passage through the potato storage hopper. This type of apparatus is more likely to retain the potato than the cup pick-up apparatus as a potato will not be easily dislodged once it is impaled on the impaling spike, however, the problem of removing the potato from the impaling spike arises. This function has previously been carried out by a stripper mounted on the element carrying the impaling spike. The stripper carries a projection which contacts a cam at the point at which the potato is to be dislodged and the stripper is thereby tripped and wipes the potato from the impaling spike as the conveyor belt or chain moves it past the cam. This type of pick-up and delivery apparatus tends to be relatively complex and expensive and there is a possibility that the projection on the stripper will accidentally come into contact with some obstruction other than the cam, with the result that the stripper will be prematurely tripped and the potato, being carried by the impaling spike, prematurely removed. Further, both the cam and the projection on the stripper are subject to wear and breakage with the result that the stripper may not be properly tripped at all times.

I have found that the disadvantages of the known pick-up and delivery devices may be overcome by providing, in accordance with this invention, an article pick-up and delivery apparatus including two rotatable wheels, a driven, endless flexible member passing over said wheels, at least one pick-up and delivery element on said flexible member, said pick-up and delivery element comprising a pick-up member extending outwardly from said flexible member and substantially normal thereto, a tine projecting from said pick-up member in the direction of travel of said flexible member and parallel thereto and a stripper extending outwardly from said flexible member past said tine in substantially parallel, overlying relationship to said pick-up member and in close proximity thereto, at least one of said rotatable wheels being of sufficiently small diameter to induce movement of said stripper, as it passes over said one rotatable wheel, away from said pick-up member throughout the length of said tine whereby to release an article retained by said tine.

In drawings which illustrate embodiments of the invention, FIGURE 1 is an elevation, partly in section of the overall pick-up and delivery apparatus;

FIGURE 2 is a perspective view of a chain mounted pick-up and delivery element in accordance with the invention; and FIGURE 3 is a perspective view of another embodiment of a chain mounted pick-up and delivery element in accordance with the invention.

Referring now to FIGURE 1 of the drawings, the complete pick-up and delivery apparatus is illustrated, comprising a link chain 1 passing over an upper sprocket 2 of small diameter and a lower sprocket 3 of large diameter and driven in the direction indicated by arrows 4. Situated on the link chain are a plurality of pick-up and delivery elements designated generally as 5. Each pick-up and delivery element comprises a tine support plate 6 and a stripper plate 7 extending from adjacent links of the link chain. Projecting from the tine support plate in the direction of travel of the chain and towards the stripper plate, are two tines 8 which are spaced apart both transversely and longitudinally of the tine support plate as illustrated more particularly in FIGURES 2 and 3 of the drawings. Adjacent the large diameter sprocket 3 is a potato storage hopper 10 having an opening 11 in the bottom thereof and a curved pick-up chute 12 depending from the bottom of the hopper, adjacent the opening. The pick-up chute is preferably in the form of an arc of a circle which is concentric with the large diameter spocket 3. Adjacent the small diameter sprocket 2 is a potato receiving chute 13 adapted to receive a potato carried by a pick-up and delivery element and to direct it towards a potato cutting mechanism which does not form a part of this invention and is not shown in the drawings.

Turning now to FIGURE 2 of the drawings the construction of one pick-up and delivery elements will be described in detail. Extending from link 14 and attached thereto at either side thereof, either by welding or any other suitable means, is tine support plate 6. The lower portion of the tine support plate bridging the two sides of link 14 is cut away in an arc as at 16 to prevent interference with sprockets 2 and 3. Projecting from the forward face of the tine support plate 6 are two tines 8. These tines are spaced apart both transversely and longitudinally of the tine support plate and may be affixed to the plate in any suitable manner. In the embodiment depicted in FIGURE 2 the tines extend through holes 17 in the tine support plate and are there welded to the plate.

Link 15 is immediately adjacent to link 14 and attached thereto as at 20 and 21 is stripper plate 6. As in the case of the tine support plate the attachment at 20 and 21 may be by welding, and the lower edge of the stripper plate is cut away in an arc as at 22 to prevent interference with the sprockets 2 and 3. The stripper plate is approximately the same length as, or possibly longer than the tine support plate; however the outer half of the stripper plate is cut away to form shoulders 23 and 24 with a central extension 25 extending between the two tines 8. When link chain 1 is straight or unflexed (as illustrated in FIGURE 2) the stripper plate extends generally parallel to the tine support plate with a slight inclination towards the latter so that the outer end of the stripper plate touches, or is in close proximity to the forward face of the tine support plate.

In operation, the endless link chain 1 is driven in the direction of arrows 4 over sprockets 2 and 3. When the link chain is straight or unflexed or when it passes over the large diameter pulley 3 the pick-up and delivery elements are in the position illustrated in FIGURE 2 with the pointed ends of tines 8 projecting beyond the stripper plate. As each pick-up and delivery element passes around large diameter sprocket 3 and through the pick-up chute 12, a potato is impaled on tines 8 and is carried upwardly towards small diameter sprocket 2. As the pick-up and delivery element reaches the small diameter sprocket 2, link 15, following the periphery of sprocket 2, pivots with respect to link 14 sufficiently to cause stripper plate 7, including central extension 25 to rotate forwardly with respect to tine support plate 6 as illustrated in FIGURE 1. This rotation of the stripper plate causes central extension 25 to sweep the full length of tines 8 whereby to wipe off a potato impaled thereon. As the pick-up and delivery element passes completely around small diameter sprocket 2 and commences its movement towards large diameter sprocket 3 the elements again assume the position as illustrated in FIGURE 2.

In FIGURE 3, in which like elements are designated by like reference numerals a further embodiment of the pick-up and delivery apparatus is illustrated. According to this embodiment the pick-up and delivery elements are off-set laterally from the longitudinal axis of the link chain by means of lateral extensions 26 and 27 on the tine support plate and stripper plate, respectively. Successive pick-up and delivery elements are off-set to opposite sides of the longitudinal axis of the link chain such that no two adjacent pick-up and delivery elements are located on the same side of link chain 1. This construction permits elements on opposite sides of the chain to pass through separate channels of a bifurcated potato pick-up chute which is not shown in the drawings but which may be formed by inserting a central divider pick-up chute 12. The advantage of this embodiment is that the pick-up and delivery elements may be spaced closer together than those of the embodiment illustrated in FIGURE 2, without one element interfering with the operation of the next adjacent element. As a result of this closer spacing a greater number of potatoes can be handled without increasing the operating speed of the apparatus.

It will be evident that many modifications may be made to the apparatus described above without departing from the scope of the invention. For instance, a belt or other flexible member could be used in place of the link chain, and the tines could pass through slots in the stripper instead of through cut-out side portions as illustrated. Alternatively, one or more tines could be used although two are preferable.

The sprockets need not be of different diameter provided that the sprocket at the delivery end of the conveyor is of sufficient diameter to induce movement of the stripper plate away from the pick-up support plate throughout the length of the tines. It is only necessary that the tines project beyond the stripper plate as they pass through the pick-up chute which may be located at an unflexed portion of the link chain rather than at one of the sprockets.

What I claim as my invention is:

1. Article pick-up and delivery apparatus including two rotatable sprockets, a driven, endless, link chain passing over said sprockets, at least one pick-up and delivery element on said link chain, said pick-up and delivery element comprising a pick-up member extending outwardly from said link chain and substantially normal thereto, a tine projecting from said pick-up member in the direction of travel of said link chain and parallel thereto and a stripper extending outwardly from an immediately adjacent link of said link chain past said tine in substantially parallel overlying relationship to said pick-up member and in close proximity thereto, at least one of said rotatable sprockets being of sufficiently small diameter to induce movement of said stripper, as it passes over said one rotatable sprocket, away from said pick-up member throughout the length of said tine whereby to release an article retained by said tine.

2. Apparatus as defined in claim 1, wherein said endless flexible member is a link chain and said rotatable wheels are sprockets.

3. Apparatus as defined in claim 1, wherein said pick-up member and said stripper are flat plates.

4. Apparatus as defined in claim 1, wherein two tines project from said pick-up member adjacent the end thereof remote from said link chain, and part of said stripper extends between said two tines.

5. Apparatus as defined in claim 1, including a plurality of said pick-up and delivery elements, successive pick-up and delivery elements being off-set to opposite sides of the longitudinal axis of said link chain.

6. Apparatus as defined in claim 1, wherein the other of said two rotatable sprockets is of larger diameter than said one sprocket whereby to permit said pick-up member and said stripper to remain in substantial parallelism as they pass over said other sprocket.

References Cited by the Examiner

UNITED STATES PATENTS

| | | | |
|---|---|---|---|
| 851,122 | 4/07 | Duensing | 198—178 |
| 2,152,393 | 3/39 | Turner | 198—178 |

SAMUEL R. COLEMAN, *Primary Examiner.*

ERNEST A. FALLER, JR., *Examiner.*